United States Patent
Chen et al.

(10) Patent No.: US 8,294,844 B2
(45) Date of Patent: Oct. 23, 2012

(54) LIQUID CRYSTAL DISPLAY AND ASSEMBLY METHOD OF THE SAME

(75) Inventors: Li-Yi Chen, Zhushan Township, Nantou County (TW); Cheng-Jung Chen, Tainan (TW); Yu-Ming Lin, Guiren Township, Tainan County (TW); Hung-Chih Lin, Tainan (TW); Yi-Shun Wang, Taipei City (TW)

(73) Assignee: Chimei Innolux Corporation, Miao-Li County (TW)

( * ) Notice: Subject to any disclaimer, the term of this patent is extended or adjusted under 35 U.S.C. 154(b) by 243 days.

(21) Appl. No.: 12/889,840

(22) Filed: Sep. 24, 2010
(Under 37 CFR 1.47)

(65) Prior Publication Data
US 2011/0116001 A1    May 19, 2011

(30) Foreign Application Priority Data

Sep. 25, 2009    (TW) .............................. 98132450 A (51) Int. Cl.
G02F 1/1333    (2006.01)

(52) U.S. Cl. .......................................... 349/59; 349/58

(58) Field of Classification Search ............... 349/58–60
See application file for complete search history.

(56) References Cited

U.S. PATENT DOCUMENTS

| | | | | |
|---|---|---|---|---|
| 6,356,334 B1 * | 3/2002 | Mathew et al. | ............... | 349/153 |
| 6,522,372 B2 * | 2/2003 | Yang | ................. | 349/58 |
| 6,557,174 B2 * | 5/2003 | Martin et al. | ...................... | 2/8.8 |
| 7,570,317 B2 * | 8/2009 | Zhou et al. | ...................... | 349/58 |
| 7,586,556 B2 * | 9/2009 | You et al. | ......................... | 349/58 |
| 7,978,283 B2 * | 7/2011 | Tsutsumi et al. | ............... | 349/59 |
| 8,120,722 B2 * | 2/2012 | Jung et al. | ....................... | 349/58 |
| 2002/0171783 A1 * | 11/2002 | Yang | ................. | 349/58 |
| 2006/0268193 A1 * | 11/2006 | Wang et al. | ...................... | 349/59 |
| 2007/0091226 A1 * | 4/2007 | Yamanaka | ..................... | 349/60 |
| 2007/0126335 A1 * | 6/2007 | You et al. | ...................... | 313/485 |
| 2007/0139578 A1 * | 6/2007 | Zhou et al. | ....................... | 349/58 |
| 2007/0139580 A1 * | 6/2007 | Zhang | ............................. | 349/58 |
| 2008/0266485 A1 * | 10/2008 | Shen et al. | ....................... | 349/59 |

* cited by examiner

Primary Examiner — Rhonda Peace
(74) Attorney, Agent, or Firm — Trop Pruner & Hu, P.C.

(57) ABSTRACT

A liquid crystal display is provided. The liquid crystal display includes a rear bezel, a signal controlling board module, a light source module, a clipping frame, a display panel and a front frame. The rear bezel has a main portion, a receptacle and a plurality of carrying stages. The carrying stages surround the receptacle. The receptacle protrudes from the main body along a direction while the carrying stages protrude from the main portion toward the reverse of the direction. The main body, the receptacle and the carrying stages are formed in one piece. The signal controlling board module is fixed in the receptacle. The carrying stages carry the light source module. The clipping frame and the rear bezel clip the light source module together. The display panel is disposed on the clipping frame. The front frame and the clipping frame clip the display panel together.

19 Claims, 8 Drawing Sheets

LIQUID CRYSTAL DISPLAY AND ASSEMBLY METHOD OF THE SAME

CROSS-REFERENCE TO RELATED APPLICATION

This application claims the priority benefit of Taiwan application serial no. 98132450, filed on Sep. 25, 2009. The entirety of the above-mentioned patent application is hereby incorporated by reference herein and made a part of this specification.

BACKGROUND OF THE INVENTION

1. Field of the Invention

The present invention relates to a display and an assembly method thereof, and particularly to a liquid crystal display (LCD) and an assembly method thereof.

2. Description of Related Art

In current society, the development of multi-media technologies relies much on the progress of semiconductor devices or display apparatuses. The Liquid crystal displays having advantages of good displaying quality, high space-effectiveness, low power consuming and non-radiation become the mainstream of the market. Generally, the liquid crystal display is composed of a liquid crystal display panel, a backlight module and a frame.

Figure 1:
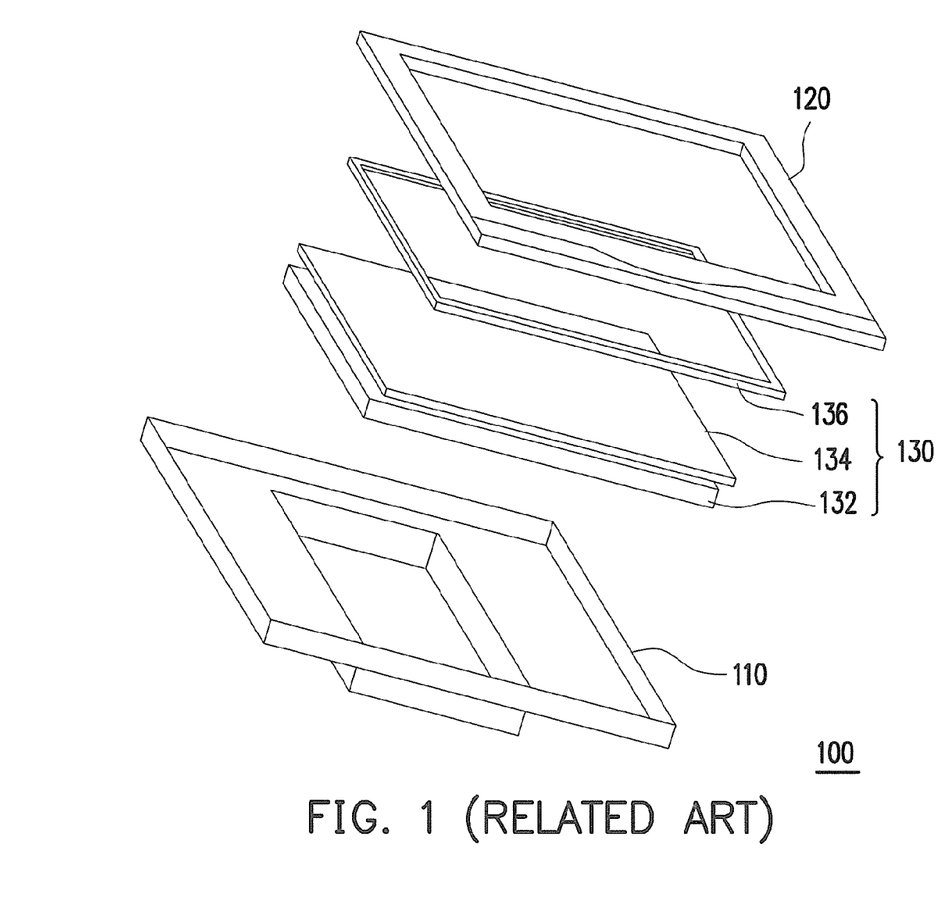
FIG. 1 is a three-dimensional and explosive view of a conventional liquid crystal display.

FIG. 1 is a three-dimensional and explosive view of a conventional liquid crystal display. As shown in FIG. 1, the conventional liquid crystal display 100 comprises a rear bezel 110, a device front frame 120 and a display module 130 disposed between the rear bezel 110 and the device front frame 120. The display module 130 comprises a backlight module 132, a liquid crystal display panel 134 and a display module front frame 136.

Generally, the backlight module 132, the liquid crystal display panel 134 and the display module front frame 136 are assembled to from the liquid crystal display module 100 by the factories of the panels, first. In details, the backlight module 132 is composed of a metal rear plate (not shown) and a light source module (not shown) assembled within the metal rear plate. Meanwhile, the display module front frame 136 and the metal rear plate of the backlight module 132 together hold the liquid crystal display panel 134 to constitute the display module 130. Then, the factories of the panels transfer the assembled display module 130 to the system factories. Thereafter, the rear bezel 110, the device front frame 120, the display module 130 and the signal controlling circuit board 140 are assembled to form the liquid crystal display 100.

Under the assembling procedure mentioned above, the display module 130 is transferred between the factories of the panels and the system factories. However, in the transportation process, the components such as the liquid crystal display panel 134 and the backlight module 132 may loosen, which leads to collision, crack and scrape. Therefore, it is necessary to use display module front frame 136 to fasten the display module 130. The display module front frame 136 is generally made of metal material and accounts for a part of the material cost of the liquid crystal display 100.

Further, the transportation of the display module 130 between the factories of the panels and the system factories inevitably increases the transportation fee. Moreover, after assembling the display module 130, the factories of the panels perform the detection and the aging test of the display module 130, and after assembling the liquid crystal display 100, the system factories perform the detection and the aging test of the liquid crystal display 100 again. Hence, the cost of manufacturing the liquid crystal display 100 can not be effectively decreased.

SUMMARY OF THE INVENTION

The invention provides a liquid crystal display in which the liquid crystal display panel and the light source module are disposed between the rear bezel and the front frame and which is capable of saving the cost of assembly, transportation and material.

The invention provides an assembly method of the liquid crystal display in which the liquid crystal display is assembled in a single factory so that the cost of assembling the liquid crystal display in different factories can be saved.

The invention provides a liquid crystal display in which the liquid crystal display panel and the signal controlling module are disposed in the rear bezel and which is capable of saving the cost of assembly, transportation and material.

The invention provides a liquid crystal display comprising a rear bezel, a signal controlling module, a light module, a clipping frame, a display panel and a front frame. The rear bezel has a main body, a receptacle and a plurality of carrying stages. The carrying stages surround the receptacle, the receptacle protrude from the main body along a direction, the carrying stages protrude from the main body and toward a reverse of the direction, and the main body, the receptacle and the carrying stages are formed in one piece. The signal controlling module is fixed in the receptacle of the rear bezel; The carrying stages carry the light source module and the clipping frame and the rear bezel clip the light source module. The display panel is disposed on the clipping frame. The front frame and the clipping frame together clip the display panel.

According to one embodiment of the present invention, the aforementioned rear bezel further has a plurality of fixing pillars disposed in the receptacle and the signal controlling module is fixed on the fixing pillars.

According to one embodiment of the present invention, the aforementioned carrying stages comprises a rectangle platform and a plurality of carrying ribs, and a height level of the rectangle platform protruding from the main body is equal to a height level of each of the carrying ribs protruding from the main body. According to one embodiment of the present invention, the carrying stages further comprise a plurality of surrounding ribs. A height level of each of the surrounding ribs protruding from the main body is larger than the height levels of the rectangle platform and the carrying ribs protruding from the main body so that the surrounding ribs are used to fix the light source module.

According to one embodiment of the present invention, the aforementioned front frame and the rear bezel fix each other. The clipping frame comprises a frame body, a plurality of first fixing parts and a plurality of second fixing parts. The first fixing parts protrude toward the rear bezel from the frame body so as to clip the light source module and the second fixing parts protrude toward the display panel from the frame body so as to fix the display panel. Moreover, the clipping frame also comprises a bottom plate, a plurality of sidewalls and a plurality of blocking plates. The sidewalls protrude toward the reverse of the direction and from a portion of an edge of the bottom plate and the blocking plates protrude away from a side of the bottom plate and toward a center of the bottom plate so that the bottom plate, the sidewalls and the blocking plates together receive the light source module. Meanwhile, the sidewalls can have, for example, a plurality of protrusions protruding from the blocking plates and toward the reverse of the direction, and the display panel is enclosed in a region surrounded by the protrusions and the blocking plates.

According to one embodiment, the aforementioned clipping frame has a panel receptacle. The panel receptacle is disposed at a side of the clipping frame away from the rear bezel, the display panel is disposed in the panel receptacle and the clipping frame and the rear bezel fix each other.

According to one embodiment of the present invention, the aforementioned display panel has a liquid crystal display panel and a controlling circuit board. The liquid crystal display panel is clipped between the front frame and the clipping frame and the controlling circuit board is bent from an edge of the liquid crystal display panel and toward a side of the rear bezel away from the liquid crystal display panel. Moreover, the liquid crystal display further comprises a sub-rear bezel which is disposed on the rear bezel to cover the controlling circuit board.

According to one embodiment of the present invention, the light source module comprises at least a light emitting source and a plurality of optical film plates and the light emitting source is disposed at a side of each of the optical film plates. In details, the optical film plates comprise, for example, a reflecting plate, a light guide plate and a plurality of optical films. The reflecting plate is located on the carrying stages, the light guide plate is disposed on the reflecting plate and has adjacent light incident surface and a light exiting surface, the light emitting source is disposed beside the light incident surface and the optical films are located on the light exiting surface.

According to one embodiment of the present invention, the aforementioned rear bezel further comprises a plurality of strengthened ribs disposed in the receptacle.

According to one embodiment of the present invention, the aforementioned liquid crystal display further comprises a plurality of speakers fixed on the rear bezel and the speakers are located at a side of the display panel.

According to one embodiment of the present invention, the aforementioned liquid crystal display further comprises a plurality of heat dissipation aluminum plates disposed between the carrying stages and the light source module.

According to one embodiment of the present invention, the aforementioned liquid crystal display further comprises a plurality of hanging racks fixed on the receptacle of the rear bezel.

According to one embodiment of the present invention, the aforementioned liquid crystal display further comprises a paddle fixed on a side of the rear bezel away from the front frame.

According to one embodiment of the present invention, the aforementioned liquid crystal display further comprises a impact absorbing component disposed between the display panel and the front frame. For instance, the impact absorbing component is a sponge strip, a plastic strip or a rubber strip.

The present invention further provides an assembly method for the liquid crystal display. A rear bezel is provided and the rear bezel has a main body, a receptacle and a plurality of carrying stages. The carrying stages surround the receptacle, the receptacle protrude from the main body along a direction, the carrying stages protrude from the main body and toward a reverse of the direction, and the main body, the receptacle and the carrying stages are formed in one piece. A signal controlling module is fixed in the receptacle. A light source module is disposed on the carrying stages. The light source module is clipped by the clipping frame and between the rear bezel and the clipping frame. A display panel is installed on the clipping frame. The display panel is clipped by the front frame so that the display panel is located between the clipping frame and the front frame.

According to one embodiment of the present invention, the aforementioned display panel has a liquid display panel and a controlling circuit board. The step of installing the display panel comprises clipping the liquid crystal display panel between the front frame and the clipping frame and bending the controlling circuit board from an edge of the liquid crystal display panel and toward a side of the rear bezel away from the liquid crystal display panel. Moreover, the step of installing the display panel further comprises fixing a sub-rear bezel at a side of the rear bezel away from the front frame in order to cover the controlling circuit board.

According to one embodiment of the present invention, the aforementioned front frame is further fixed on the rear bezel so that the display panel and the light source module are fixed between the front frame and the rear bezel.

According to one embodiment of the present invention, the aforementioned clipping frame is further fixed on the rear bezel so that the light source module is fixed between the front frame and the rear bezel.

According to one embodiment of the present invention, before the signal controlling module is fixed, further comprising fixing a plurality of speakers on the rear bezel.

The present invention provides a liquid crystal display including a rear bezel, a signal controlling module, a display panel and a controlling circuit board. The rear bezel has a receptacle. The signal controlling module is fixed in the receptacle of the rear bezel; the display panel is disposed on the signal controlling module, wherein the signal controlling module is located between the rear bezel and the display panel. The controlling circuit board is electrically connected to the display panel, wherein the controlling circuit board is located at outside of the rear bezel so that the rear bezel is located between the controlling, circuit board and the display panel.

According to one embodiment of the present invention, the rear bezel is formed in one piece.

According to one embodiment of the present invention, the aforementioned rear bezel further has a plurality of fixing pillars disposed in the receptacle and the signal controlling module is fixed on the fixing pillars.

According to one embodiment of the present invention, the aforementioned liquid crystal display further comprises a flexible printed circuit board connected between the controlling circuit board and the display panel. According to one embodiment of the present invention, the rear bezel further has an opening and the flexible printed circuit board is located in the opening.

According to one embodiment of the present invention, the aforementioned controlling circuit board has a data driver.

According to one embodiment of the present invention, the aforementioned signal controlling module has a video printed circuit board, a power printed circuit board and an inverter printed circuit board.

According to one embodiment of the present invention, the rear bezel has a supporting structure.

In the present invention, the light source module and the liquid crystal display panel are directly assembled on the rear bezel. Thus, it is not necessary to perform a two-step assembly process for manufacturing the liquid crystal display so that the fabrication cost is reduced and the transportation cost is reduced as well. Furthermore, in the present invention, it is not necessary to transport the liquid crystal display between different process steps so that the probability of damaging the liquid crystal display during the transportation can be decreased. Moreover, only one detection and one aging test are performed after the liquid crystal display is assembled. Therefore, the assembly procedure of the liquid crystal display is simplified.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 2A:
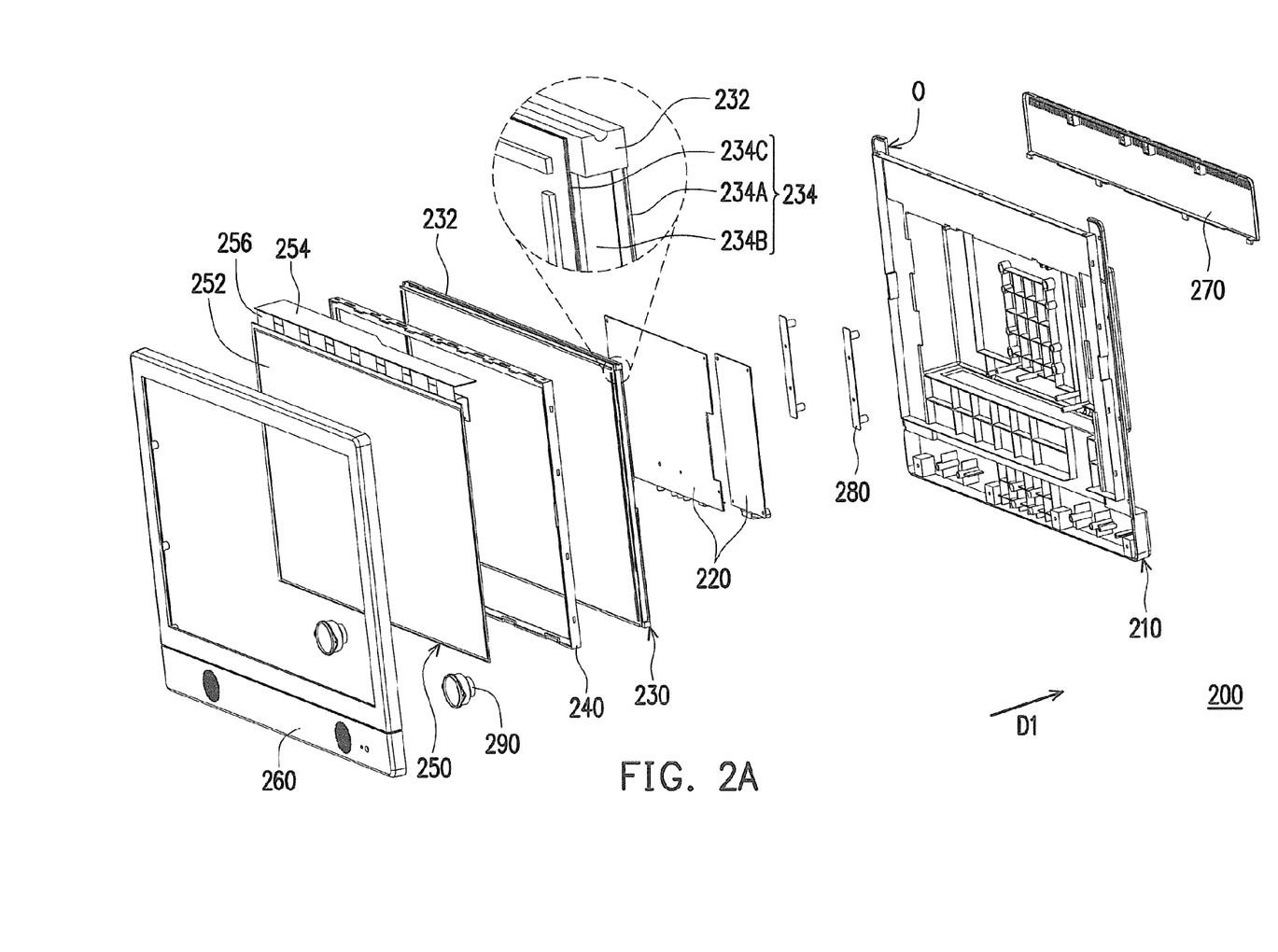
FIG. 2A is an explosive view of a liquid crystal display according to one embodiment of the present invention.
Figure 2B:
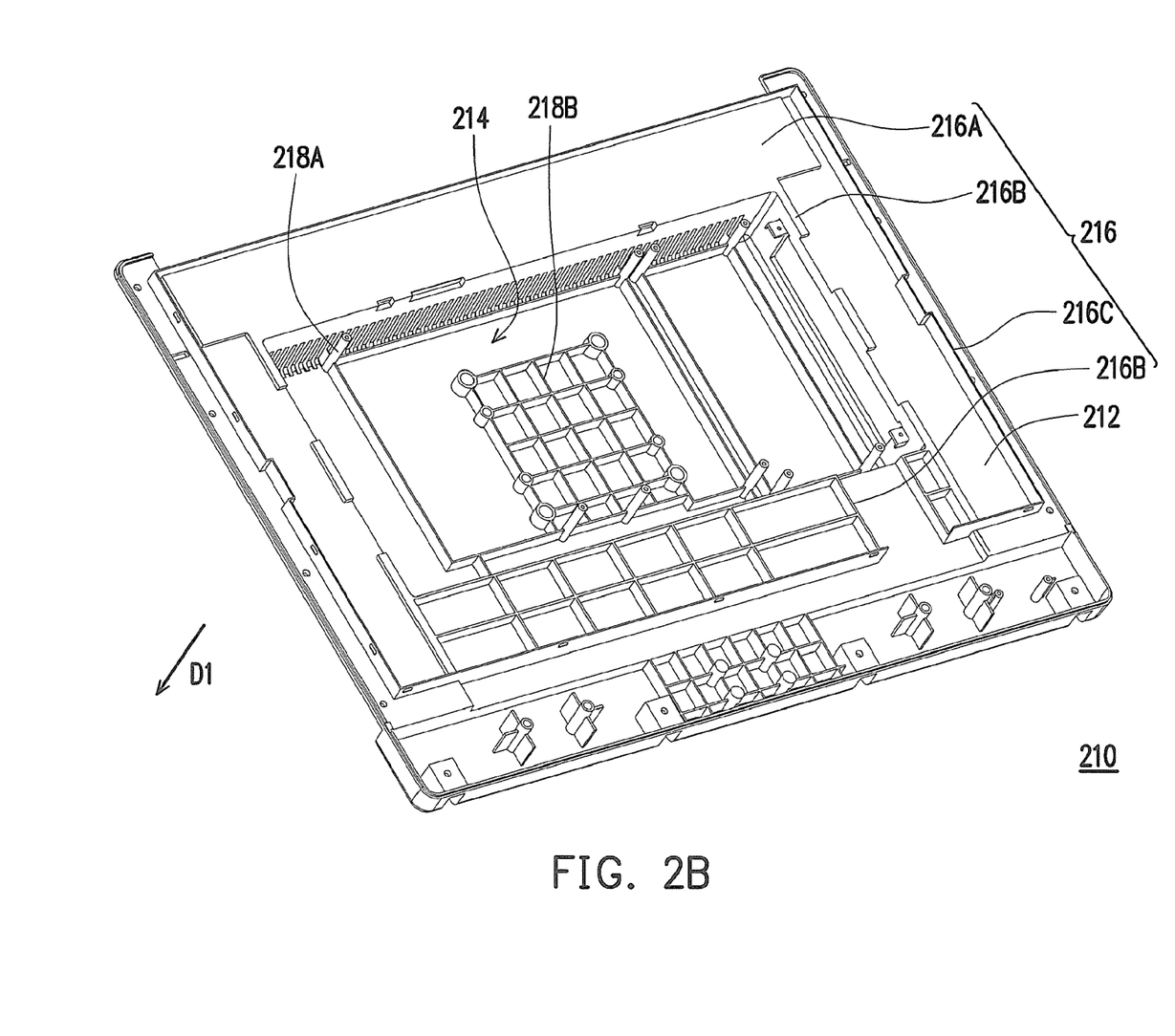
FIG. 2B is an explosive view of a rear bezel of a liquid crystal display according to one embodiment of the present invention.

FIG. 2A is an explosive view of a liquid crystal display of one embodiment of the present invention. FIG. 2B is an explosive view of a rear bezel of a liquid crystal display according to one embodiment of the present invention. As shown in FIG. 2A, a liquid crystal display 200 comprises a rear bezel 210, a signal controlling module 220, a light module 230, a clipping frame 240, a display panel 250 and a front frame 260.

In details, as shown in FIG. 2A and FIG. 2B, the rear bezel 210 has a main body 212, a receptacle 214 and a plurality of carrying stages 216. The carrying stages 216 located at the periphery of the receptacle 214 surround the receptacle 214 and the receptacle 214 protrudes from the main body 212 along a first direction D1. The carrying stages 216 protrude from the main body 212 and toward a reverse of the first direction D1. Herein, the main body 212, the receptacle 214 and the carrying stages 216 are formed in one piece. In brief, the rear bezel 210 is a one-piece plastic housing. The rear bezel 210 has a supporting structure such as a screw hole used for fixing a hanging apparatus or fixing a standing structure standing on a horizontal plane such as a tabletop. Furthermore, the rear bezel 210 is an appearance of the liquid crystal display 200 so that the rear bezel 210 can equipped with controlling keys and speaker apparatus. The signal controlling module 220 is fixed in the receptacle 214 of the rear bezel 210. The signal controlling module 220 can comprise a power module and an image processing module. The power module further comprises a power converting mechanism such as a power converting module converting the alternating current into the direct current or converting the direct current into alternating current. For instance, the signal controlling module 220 can be the combination of a video printed circuit board (video PCB), a power printed circuit board (power PCB) or a inverter printed circuit board (inverter PCB). Further, for sake of saving space, the power PCB and the inverter PCB can be disposed on the same circuit board. The carrying stages 216 carry the light source module 230 and the clipping frame 240 and the rear bezel 210 clip the light source module 230. The display panel 250 is disposed on the clipping frame 240. The front frame 260 and the clipping frame 240 together clip the display panel 250.

In the present embodiment, the rear bezel 210 has the receptacle 214 for receiving the signal controlling module 220 and also has the carrying stages 216 for carrying the light source module 230. Therefore, without using the conventional metal rear plate, the light source module 230 can be directly assembled on the rear bezel 210. Meanwhile, without using the display module front frame, the display panel 250 and the light source 230 can compose an independent display module. That is, in the design of the present embodiment, the costs and the assembly steps of the metal rear plate and display module front frame can be saved.

Moreover, the main body 212 of the present embodiment is the standard platform at the same plane in the rear bezel 210 and not for carrying any other component. Practically, the standard plane provided by the main body 212 leads to that the rest portions of the rear bezel 210 protrude toward either the first direction D1 or the reverse of the first direction D1 so that the structures with different height levels or depths are formed in the rear bezel 210 for carrying various components. Meanwhile, the components protruding from the main body 212 toward different directions benefit the enhancement of the mechanical strength of the rear bezel 210. Off course, in other embodiments, the design of the rear bezel 210 is not limited by the descriptions mentioned above and the aforementioned design of the rear bezel 210 is only an exemplar.

According to the design of the present invention, the rear bezel 210 not only possesses a relatively high mechanical strength but also benefits the simplification of the assembly method of the liquid crystal display 200. For instance, the assembly method of the liquid crystal display 200 of the present embodiment is illustrated in the following descriptions. The rear bezel 210 is provided. The signal controlling module 220 is fixed in the receptacle 214 of the rear bezel 210. The light source module 230 is disposed on the carrying stages 216 of the rear bezel. The light source module 230 is clipped by the clipping frame 240 and between the rear bezel 210 and the clipping frame 240. The display panel 250 is installed on the clipping frame 240. The display panel 250 is clipped by the front frame 260 so that the display panel 250 is located between the clipping frame 240 and the front frame 260.

In brief, the assembly method of the liquid crystal display 200 of the present embodiment comprises sequentially assembling the signal controlling module 220, the light module 230, the clipping frame 250, the display panel 250 and the front frame 260 on the rear bezel 210. In other words, in the present embodiment, the liquid crystal display 200 can be assembled by performing a sequence of steps. Comparing with the conventional two-independent-step assembly method for the liquid crystal display 100, the assembly method of the present embodiment is relatively simple and can be performed in the same factory. Hence, in the present embodiment, it is not necessary to transport the semi-products (which are the independent display modules) between the panel factories and the system factories so that the probability of damaging the products during the transportation can be decreased and the cost for transporting the products can be saved. It should be noticed that, in order to prevent the liquid crystal display 200 from being contaminated by the external substances such as particles, the assembly method of the present embodiment can be performed under the clean condition to further ensure the quality of the liquid crystal display 200.

In the present embodiment, the display panel 250 has, for example, a liquid crystal display panel 252 and a controlling circuit board 254. The controlling circuit board 254 is connected to at least one side of the liquid crystal display panel 252 and a flexible printed circuit board (flexible-PCB) is used to connect between the controlling circuit board 254 and the liquid crystal display panel 252. The controlling circuit board 254 has a data driver for receiving the control of the timing controlling circuit to store the digital video signals of the high frequency input and, with the turning-on the scan lines, the digital video signals are converted into the voltages output to the pixel electrodes of the liquid crystal display panel 252 in order to drive the data lines of the liquid crystal display panel 252. When the liquid crystal display 200 is assembled, the liquid crystal display panel 252 can be clipped between the front frame 260 and the clipping frame 240, and the controlling circuit board 254 is bent from one side of the liquid crystal display panel 252 and toward to one side of the rear bezel 210 which is away from the liquid crystal display panel 252.

Figure 3:
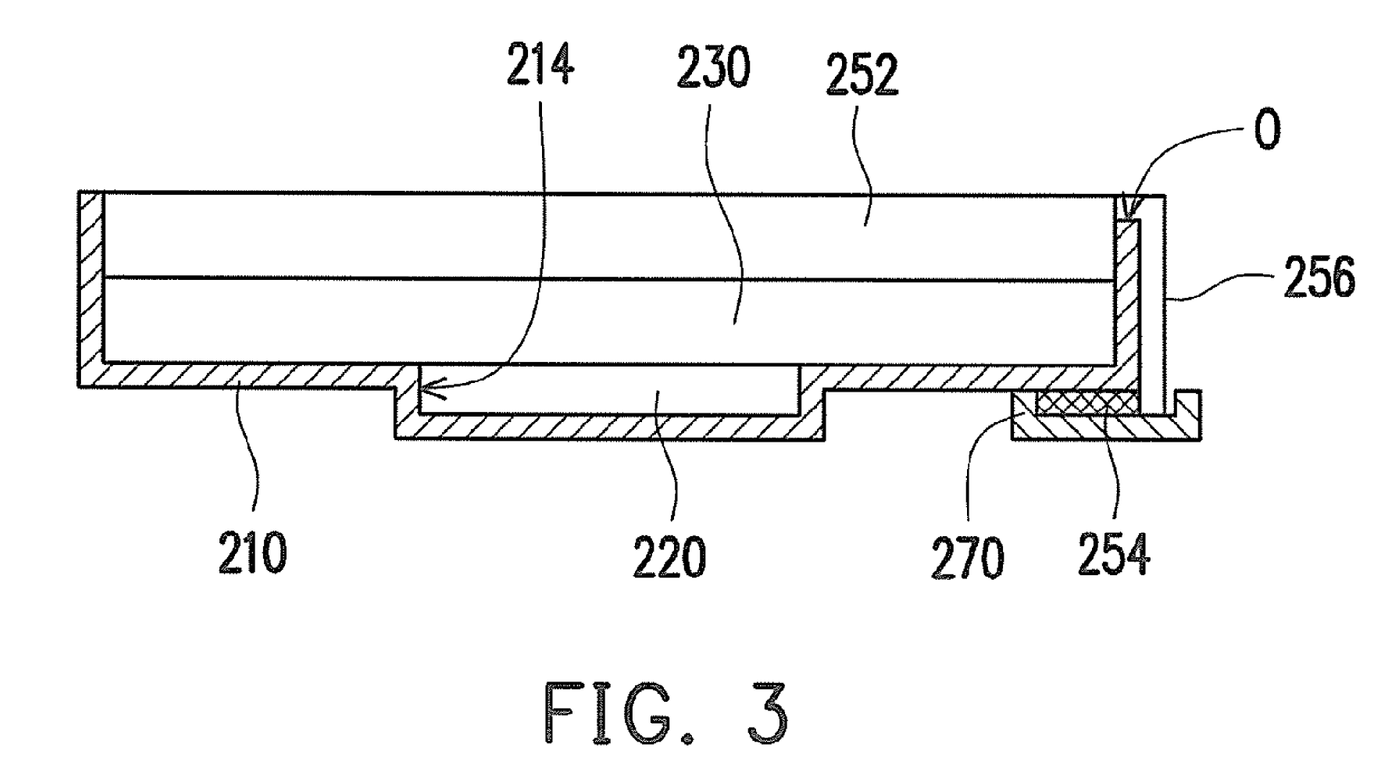
FIG. 3 is a schematic cross-sectional diagram showing portions of a liquid crystal display panel, a light source module, a signal controlling module, a rear bezel and a controlling circuit board shown in FIG. 2A.

As shown in FIG. 2A, FIG. 3, FIG. 3 is a schematic cross-sectional diagram showing portions of a liquid crystal display panel, a light source module, a signal controlling module, a rear bezel and a controlling circuit board shown in FIG. 2A. The rear bezel 210 has an opening O or a gap for the controlling circuit board 254 passing through the rear bezel 210. After passing through the opening O, the flexible-PCB 256 between the controlling circuit board 254 and the liquid crystal display panel 252 can be bent so that the controlling circuit board 254 can be disposed behind the rear bezel 210 and can be fixed at the back of the rear bezel 210.

The light source module 230 is disposed behind the liquid crystal display panel 252, the signal controlling module 220 is fixed in the receptacle 214 of the rear bezel 210 and is disposed between the rear bezel 210 and the light source module 230 and the controlling circuit board 254 passes through the rear bezel 210 and is fixed on the back of the rear bezel 210. Moreover, the flexible circuit board 254 is connected between the liquid crystal display panel 252 and the controlling circuit board 254.

The liquid crystal display 200 further comprises a sub-rear bezel 270 which is disposed on the rear bezel 210 to cover the controlling circuit board 254. Off course, the design of the controlling circuit board 254 of the present embodiment is only an exemplar. In other embodiments, if the display panel 250 does not have the controlling circuit board 254, it is not necessary to use the sub-rear bezel 270 to cover the controlling circuit board 254. It should be noticed that, in order to improve the heat dissipation of the liquid crystal display 200, the rear bezel 210 and the sub-rear bezel 270 can have a plurality of heat dissipation holes (not shown) formed thereon.

In addition, the liquid crystal display 200 further comprises at least an impact absorbing component (not shown) disposed between the display panel 250 and the front frame 260. That is, the impact absorbing component (not shown) can be disposed at a region of the front frame 260 corresponding to the edge of the display panel 250 to prevent the display panel 250 from being damaged by the collision between the display panel 250 and the front frame 260. Moreover, the existence of the impact absorbing component (not shown) can stably clip the display panel 250 between the front frame 260 and the clipping frame 240. For instance, the impact absorbing component (not shown) can be the component, such as a sponge strip, a plastic strip or a rubber strip, full of elasticity and capable of absorbing external impact.

In general, the liquid crystal display 200 of the present embodiment can be, for example, a liquid crystal television. Therefore, when the assembly method of the present embodiment is performed, the components, such as a plurality of hanging racks 280 and a plurality of speakers 290, can be fixed on the rear bezel 210. The locations of the speakers 290 can be at one side of the display panel 250. The hanging racks 280 can be disposed in, for example, the receptacle 214. Further, in order to effectively dissipate the heat generated by the optical module 230, the liquid crystal display 200 comprises a plurality of heat dissipation metal plates (not shown) disposed between the carrying stages 216 of the rear bezel 210 and the light source module 230. The material of the heat dissipation metal plates (not shown) can be aluminum or aluminum alloy. Off course, the liquid crystal display 200 further comprises a paddle (not shown) fixed on one side of the rear bezel 210 away from the front frame 260. Also, the liquid crystal display 200 comprises key sets (not shown) and the components such as the socket sets connected to the signal controlling module.

In order to simplify the assembly method of the liquid crystal display 200, there are various structure designs on the rear bezel 210. For instance, the rear bezel 210 further has a plurality of fixing pillars 218A disposed in the receptacle 214. The signal controlling module 220 can be directly fixed on the fixing pillars 218A. Moreover, there are concave structures and protruding structures with various shapes and sizes on the rear bezel 210 so that the mechanical strength of the rear bezel 210 is enhanced. Therefore, the rear bezel 210 further comprises a plurality of strengthened ribs 218B disposed in the receptacle 214. Off course, the rear bezel 210 can further equipped with supporting structure for supporting the liquid crystal display so that the liquid crystal display can stand on a plane. The supporting structure can has controlling keys for controlling and adjusting the outputs and the settings of the liquid crystal display. Also, the rear bezel 210 can have structures for fixing other components or tenons and the present invention is not limited to the structures described herein.

Further, as shown in the rear bezel 210 in FIG. 2B, the carrying stages 216 comprise, for example, a rectangle platform 216A and a plurality of carrying ribs 216B. The height of the rectangle platform 216A protruding from the main body 212 is equal to the height of the carrying ribs 216B protruding from the main body 212. That is, the rectangle platform 216A and the carrying ribs 216B provide a same height level for carrying the light source module 230. When being disposed on the carrying stages 216, the light source module 230 can be prevented from inclining or being unstable.

Meanwhile, in order to dispose the light source module 230 on the correct position, the carrying stages 216 not only provides the rectangle platform 216A and the carrying ribs 216B having the same height level but also comprises a plurality of surrounding ribs 216C. The height level of each of the surrounding ribs 216C protruding from the main body 212 is larger than the height levels of the rectangle platform 216A and the carrying ribs 216B protruding from the main body 212. It should be noticed that the design of the carrying stages 216 also can provide the function similar to that of the strengthened ribs 218B for enhancing the mechanical strength of the rear bezel 210. The surrounding ribs 216C in the present embodiment can just define a specified region so that the light source module 230 can be disposed in the region surrounded by the surrounding ribs 216C. Therefore, the design of the present embodiment can further prevent the light source module 230 from displacement and from misplacement.

For instance, as shown in FIG. 2A together with FIG. 2B, when the design of the light source module 230 is an edge incident type design, the light source module 230 comprises at least a light emitting source 232 and a plurality of optical film plates 234. The light emitting source 232 is located at one side of each of the optical film plates 234. In details, the optical film plates 234 comprises, for example, a reflecting plate 234A, a light guide plate 234B and a plurality of optical films 234C. The reflecting plate 234A is disposed on the carrying stages 216. The light guide plate 234B is disposed on the reflecting plate 234A. Generally, the light guide plate 234B has a light incident surface (not shown) and a light exiting surface (not shown) adjacent to each other. The light emitting source 232 is disposed beside the light incident surface (not shown) and the optical films 234C are disposed on the light exiting surface (not shown). The optical films 234C can be, for example, the film designs such as diffusers or brightness enhanced films which advantage the improvement of the light emission quality of the light source module 230. When being disposed on the carrying stages 216, the components are limited to being in the region surrounded by the surrounding ribs 216C so that the phenomenon of the displacement and the misplacement of the components can be avoided. That is, the stability and the reliability of the light source module 230 of the present embodiment are high.

Figure 4:
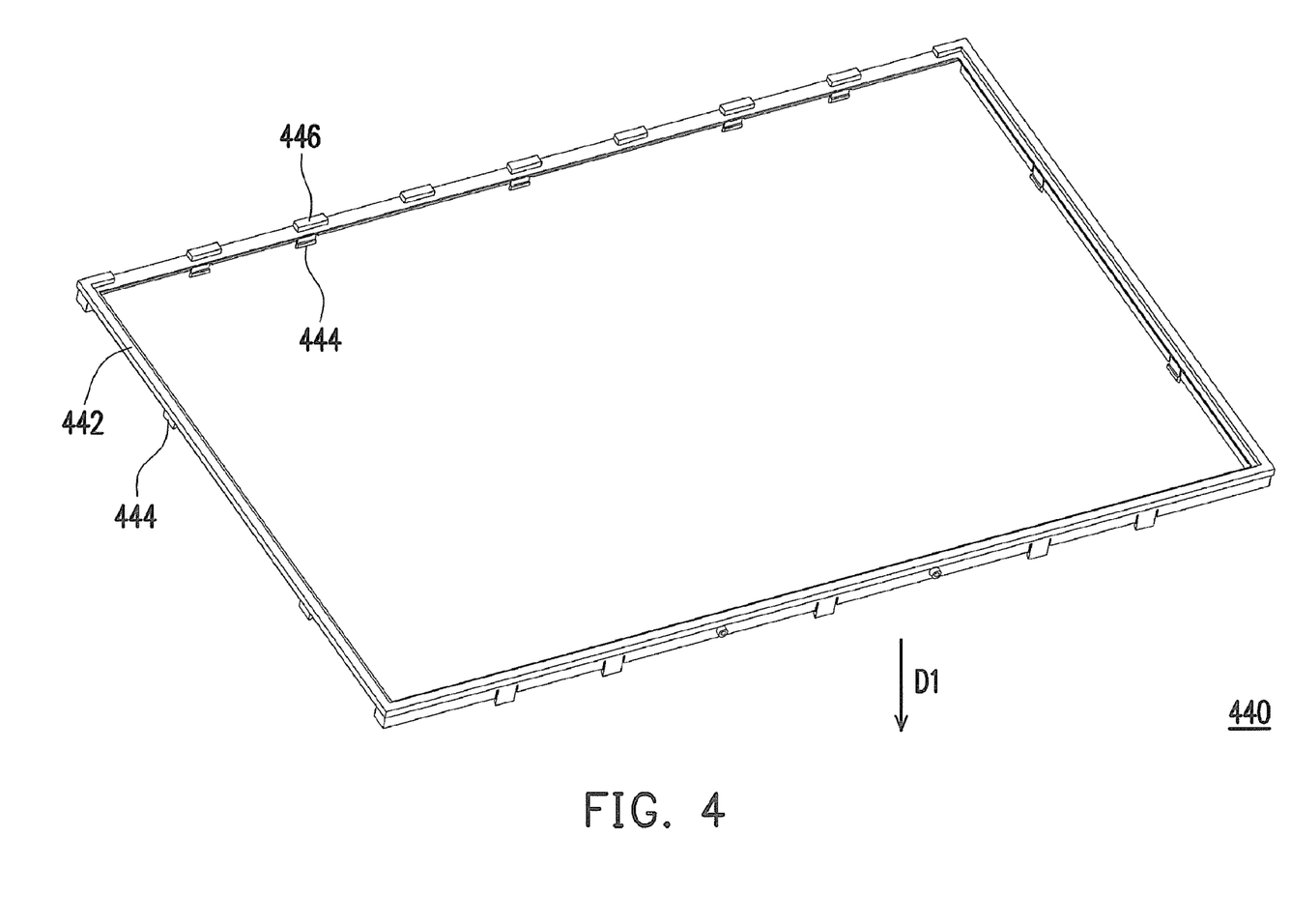
FIG. 4 illustrates a clipping frame according to one embodiment of the present invention.

Moreover, after the light source module 230 is assembled, the assembly method of the present embodiment further comprises disposing the clipping frame 240 on the light source module 230 for clipping the light source module 230 between the rear bezel 210 and the clipping frame 240. Practically, FIG. 4 illustrates a clipping frame according to one embodiment of the present invention. As shown in FIG. 2A together with FIG. 4, the clipping frame 440 comprises a frame body 442, a plurality of first fixing parts 444 and a plurality of second fixing parts 446. The frame body 442 is a rectangle hollow frame. The first fixing parts 444 protrude from the frame body 442 along the first direction D1 so as to clip each of the independent components of the light source module 230 and the second fixing parts 446 protrude from the frame body 442 and toward the reverse of the direction D1 so as to fix the display panel 250. That is, when being disposed on the clipping frame 440, the display panel 250 can be placed on the correct position. Moreover, the size of the clipping frame 440 is designed to just match the size of the region surrounded by the surrounding ribs 216C (shown in FIG. 2B) so that the displacements of the light source module 230 and the display panel 250 happening after the assembly method is finished can be avoided. In the present embodiment, the first fixing parts 444 is designed to further maintain a specific gap between the light source module 230 and the rear bezel 210 for dissipating the heat generated by the light source module 230.

Figure 5A:
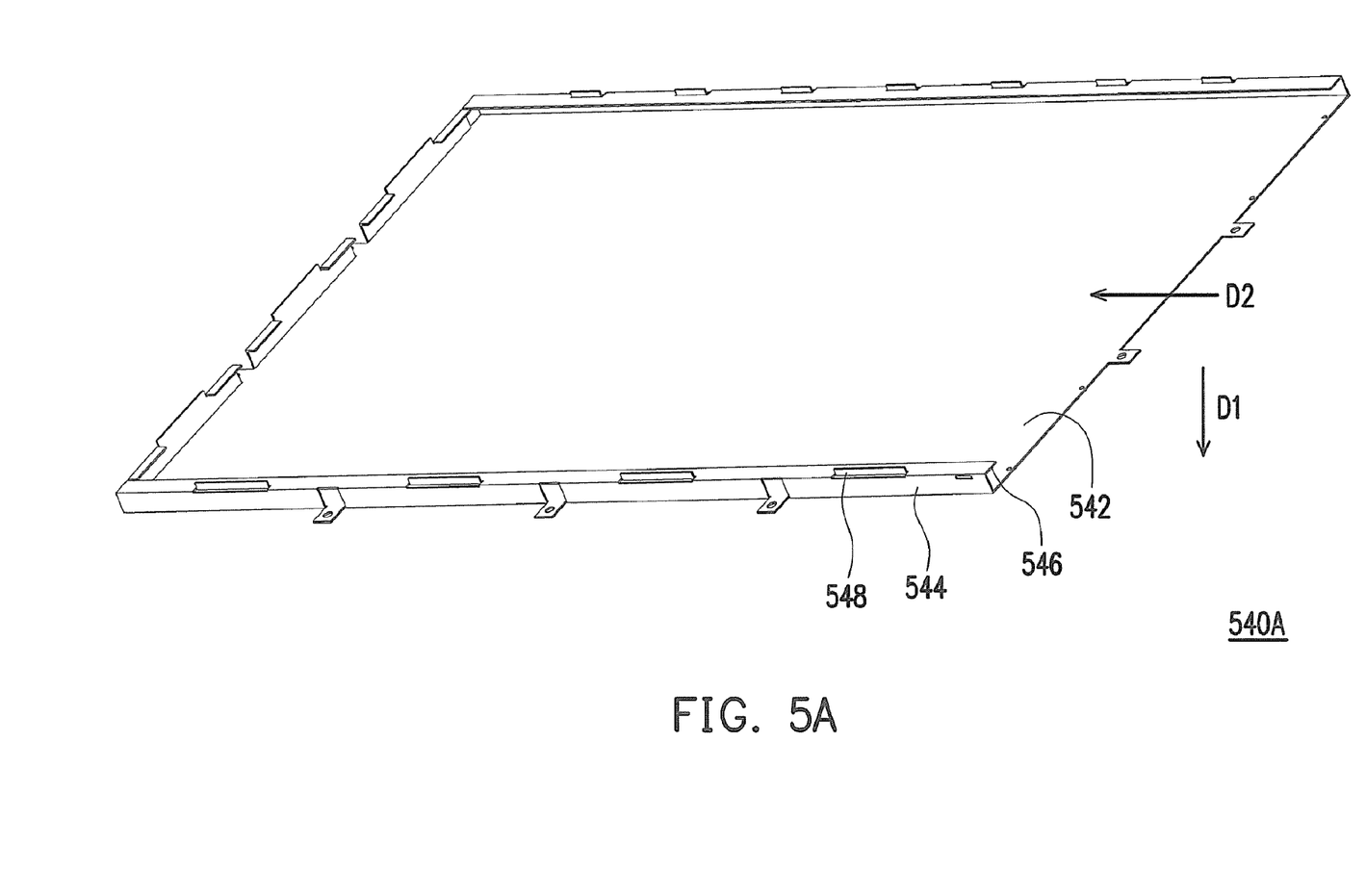
FIG. 5A illustrates another clipping frame according to one embodiment of the present invention.

Certainly, the aforesaid design of the clipping frame 440 is only an exemplar and should not be construed as limitations to the present invention. FIG. 5A illustrates another clipping frame according to one embodiment of the present invention. As shown in FIG. 5A, the clipping frame 540A can also comprise a bottom plate 542, a plurality of sidewalls 544 and a plurality of blocking plates 546. The sidewalls 544 protrude from a portion of the edge of the bottom plate 542 and toward the reverse of the first direction D1, and the blocking plates 546 protrude from the sidewalls 554, away from a side of the bottom plate and toward a center of the bottom plate.

Under the design, the bottom plate 542, the sidewalls 544 and the blocking plates 546 can together receive the light source module 230 shown in FIG. 2A. In addition, the sidewalls 544 protrude only from a portion of the edge of the bottom plate 542. That is, at least one edge of the bottom plate 542 does not have the sidewalls 544. Hence, in the assembly method of the present embodiment, for example, the light source module 230 is disposed on the bottom plate 542 through the edge of the bottom plate 542 without having any sidewalls 544. In other words, the sidewalls 544 together form a U-shape and the light source module 230 is disposed in the clipping frame 540 along a second direction D2 shown in FIG. 5.

Also, the sidewalls further comprise, for example, a plurality of protrusions 548. The protrusions 548 protrude from the blocking plates 546 and toward the reverse of the first direction D1. Therefore, the display panel 250 shown in FIG. 2A can be disposed in the region surrounded by the protrusions 548 and the blocking plates 546. That is, the protrusions 548 and the blocking plates 546 of the present embodiment together carry and position the display panel 250. Certainly, in order to dispose the light source module 230 on the correct position, the clipping frame 540 of the present embodiment matches, for example, the surrounding ribs 216C of the rear bezel 210. However, the invention is not limited to the description above. In other designs of the rear bezel 210, the clipping frame 540 can matches other components of the rear bezel 210.

Figure 5B:
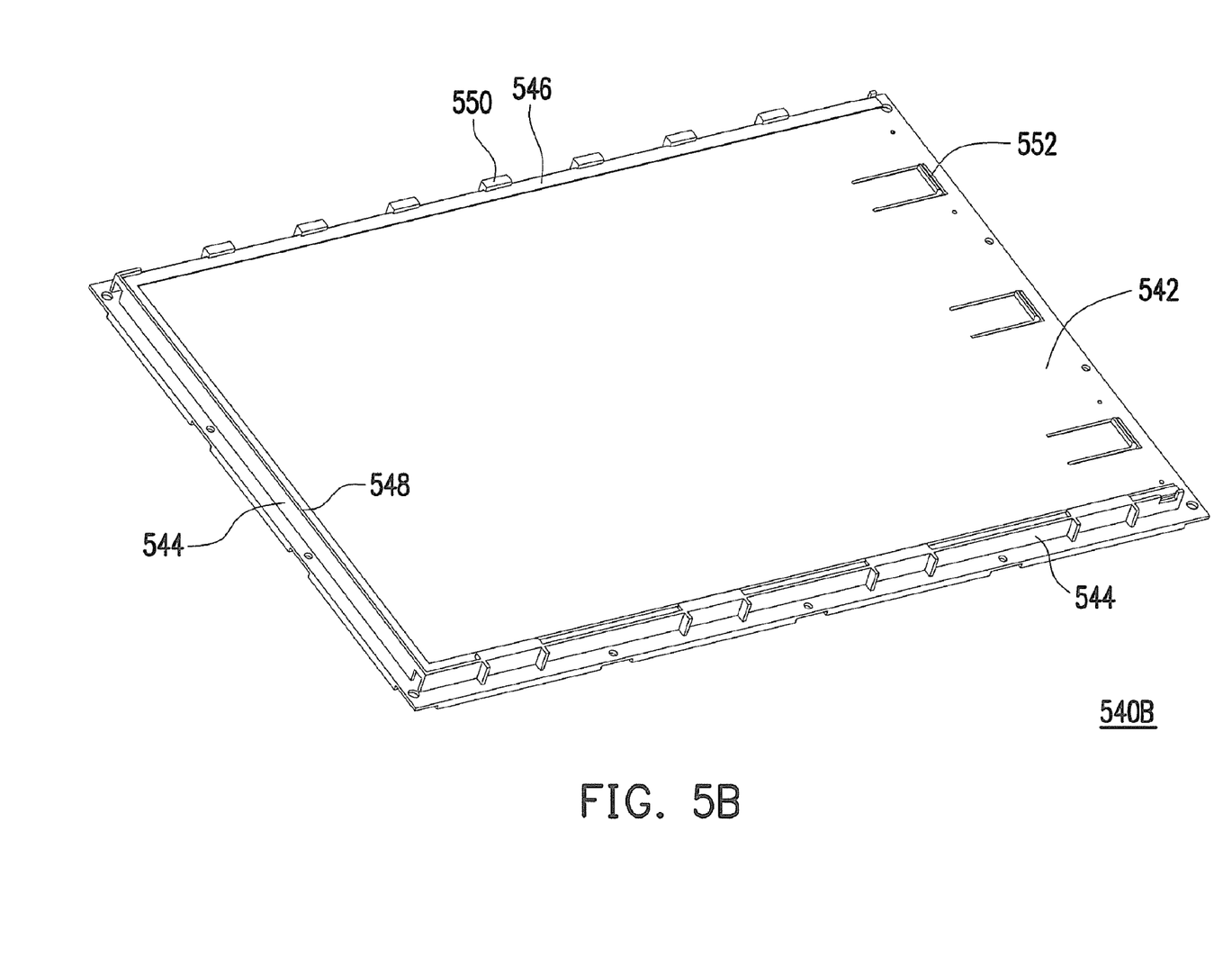
FIG. 5B illustrates another clipping frame according to one embodiment of the present invention.

FIG. 5B illustrates another clipping frame according to one embodiment of the present invention. As shown in FIG. 5B, the clipping frame 540B is similar to the clipping frame 540A mentioned above and the similar components are labeled with the same reference numbers and are not described herein. In practice, the clipping frame 540B further comprises first fixing protrusions and second protrusions 552. The first protrusions 550 are disposed on, for example, the outside of the sidewalls 544 and the first protrusions 550 and the blocking plates 546 together define a specific region for receiving the display panel 250 shown in FIG. 2A. In the present embodiment, the first protrusions 550 can be partially disposed on the sidewalls 544 and, meanwhile, the portion of the sidewalls 544 without having the first protrusions 550 disposed thereon can still has the protrusions 548 to surround a specific region for receiving the display panel 250 shown in FIG. 2A.

Moreover, the second fixing protrusions 552 are disposed on the bottom plate 542 and on a portion of the edge of the bottom plate 542 without being disposed any sidewall 544 thereon. When the second fixing protrusions 552 are applied to the liquid crystal display 200, the position of the light source module 530 can be limited to prevent the light source module 530 from being displacement. Certainly, the design of the second fixing protrusions 552 can be applied on the clipping frame 540A.

Figure 6:
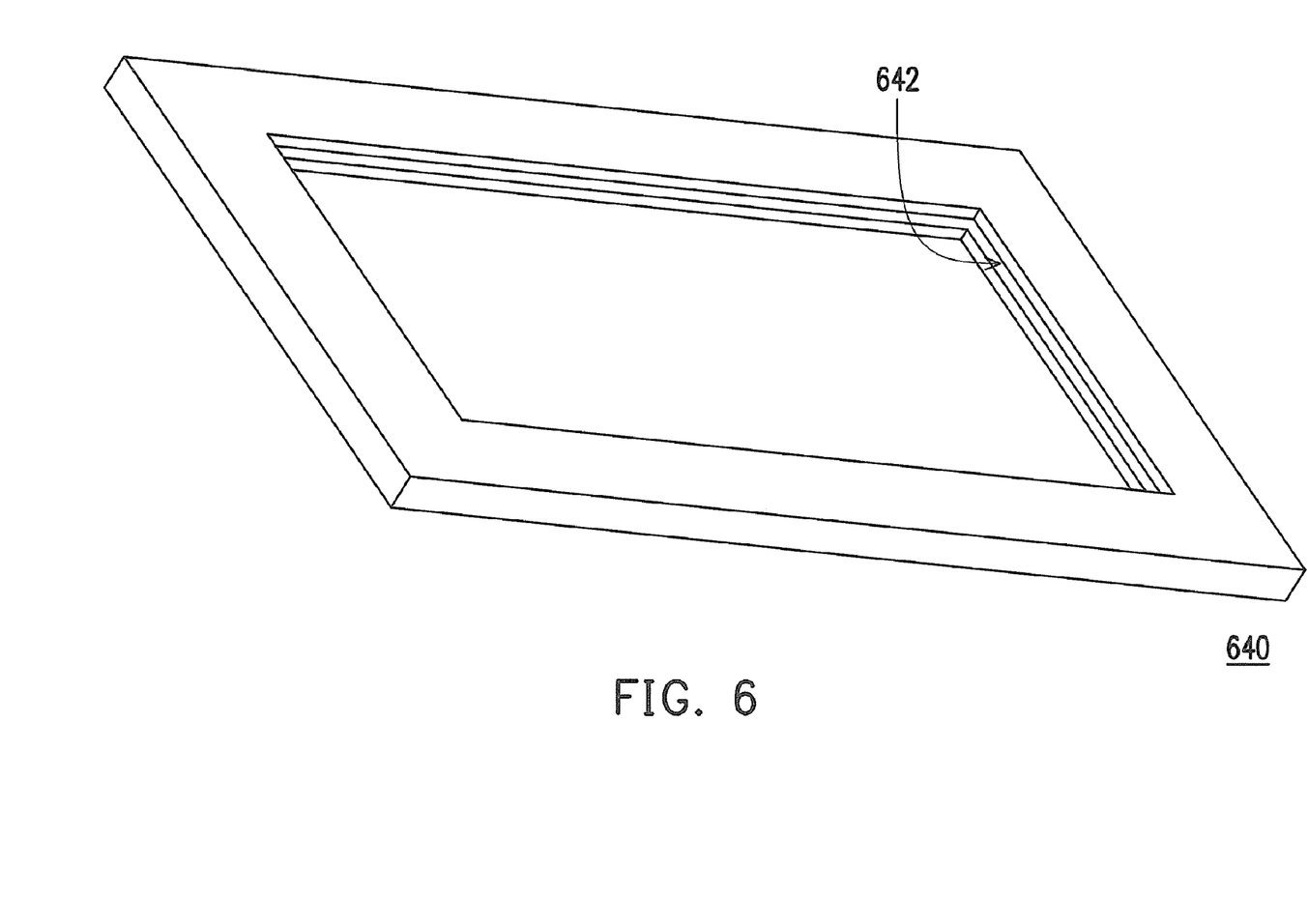
FIG. 6 illustrates the other clipping frame according to one embodiment of the present invention.

When being applied on the liquid crystal display 200 shown in FIG. 2A, the aforementioned clipping frames 440, 540 and 540B are used to clip the light source module 230 and provide appropriate structure to receive and position the display panel 250. The liquid crystal display 200 is assembled by fixing the front frame 260 with the rear bezel 210. However, the invention is not limited to the description above. In other embodiments, the clipping frame 240 can be further fixed with the rear bezel 210 to assemble the liquid crystal display 200 and it is not necessary to fix the front frame 260 on the rear bezel 210. FIG. 6 illustrates the other clipping frame according to one embodiment of the present invention. As shown in FIG. 6, the clipping frame 640 is a hollow frame and has a panel receptacle 642. When the clipping frame 640 is applied on the liquid crystal display shown in FIG. 2A, the panel receptacle 642 is disposed at one side of the clipping frame 640 away from the rear bezel 210, the display panel 250 is just disposed in the panel receptacle 642 and the clipping frame 640 and the rear bezel 210 fix each other. The panel receptacle 642 substantially surrounds a display region so that, when the display panel 250 is disposed in the panel receptacle 642, the display region is not covered.

Under this design, the size of the clipping frame 640 matches the size of the rear bezel 210. Further, the size of the front frame 260 just frames the display panel 250. That is, the front frame 260 only needs to clip the display panel 250 without fixing on the rear bezel 210. When viewing the displaying area of the liquid crystal display 200, the user can see both of the front frame 260 located at the periphery of the display panel and the clipping frame 640 matching the size of the rear bezel 210 so that the user can perceive the visual effect with image gradations. When the front frame 260 is drew with patterns or is formed with special design, the appearance of the liquid crystal display 200 is further embellished.

Generally, no matter what designs of the liquid crystal display 200 mentioned above is used, the clipping frame 240 can provide appropriate fixing structure so that the display panel 250 can be disposed on the correct position. Hence, none of the light source module 230 and the display panel 250 shifts during the transportation and the movement. Besides, the clipping frame 240 further provides the separation function for avoiding poor displaying effect due to the display panel 250 directly contacting the optical films 234C of the light source module 230. In other words, the liquid crystal display 200 is easy to be assembled, the cost for manufacturing the liquid crystal display 200 is decreased and the displaying effect and displaying quality of the liquid crystal display 200 are improved.

Altogether, the conventional liquid crystal display is formed by assembling the display module, and then assembling the display module with the components including the apparatus housing, the signal controlling module and the speakers. Therefore, the conventional liquid crystal display is assembled in different factories and in a two-step assembly process. Thus, the procedure for assembling the conventional liquid crystal display can not be simplified. Further, the transportation of the display module between the factories increases the manufacturing cost. In the present invention, the design of the rear bezel is changed so that the components including the signal controlling module, the light source module and the display panel can be directly and sequentially disposed on the rear bezel. Hence, the assembly method for the liquid crystal display is simplified. Moreover, in the liquid crystal display of the present invention, it is not necessary to use the metal rear plate to carry the light source module and it is not necessary to additionally use the display module front frame to clip the light source module and the display panel. Therefore, a portion of the manufacturing cost is saved. In brief, the liquid crystal display and the assembly method for the liquid crystal display of the present invention at least have the advantages of simple assembling procedure and low material cost.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A liquid crystal display, comprising:
 a rear bezel having a main body, a receptacle and a plurality of carrying stages, wherein the carrying stages surround the receptacle, the receptacle protrudes from the main body along a direction, the carrying stages protrude from the main body and toward a reverse of the direction, and the main body, the receptacle and the carrying stages are formed in one piece;
 a signal controlling module fixed in the receptacle of the rear bezel;
 a light source module carried by the carrying stages;
 a clipping frame, wherein the clipping frame and the rear bezel clip the light source module;
 a display panel, disposed on the clipping frame; and
 a front frame, wherein the front frame and the clipping frame together clip the display panel.

2. The liquid crystal display of claim 1, wherein the rear bezel further has a plurality of fixing pillars located in the receptacle and the signal controlling module is fixed on the fixing pillars.

3. The liquid crystal display of claim 1, wherein the carrying stages comprises a rectangle platform and a plurality of carrying ribs, and a height level of the rectangle platform protruding from the main body is equal to a height level of each of the carrying ribs protruding from the main body.

4. The liquid crystal display of claim 3, wherein the carrying stages further comprise a plurality of surrounding ribs, and a height level of each of the surrounding ribs protruding from the main body is larger than the height levels of the rectangle platform and the carrying ribs protruding from the main body so that the surrounding ribs are used to fix the light source module.

5. The liquid crystal display of claim 1, wherein the front frame and the rear bezel fix each other.

6. The liquid crystal display of claim 5, wherein the clipping frame comprises a frame body, a plurality of first fixing parts and a plurality of second fixing parts, and the first fixing parts protrude toward the rear bezel from the frame body so as to clip the light source module and the second fixing parts protrude toward the display panel from the frame body so as to fix the display panel.

7. The liquid crystal display of claim 5, wherein the clipping frame comprises a bottom plate, a plurality of sidewalls and a plurality of blocking plates, the sidewalls protrude toward the reverse of the direction and from a portion of an edge of the bottom plate, the blocking plates protrude away from a side of the bottom plate and toward a center of the bottom plate so that the bottom plate, the sidewalls and the blocking plates together receive the light source module.

8. The liquid crystal display of claim 7, wherein the sidewalls have a plurality of protrusions protruding from the blocking plates and toward the reverse of the direction and the display panel is disposed in a region surrounded by the protrusions and the blocking plates.

9. The liquid crystal display of claim 1, wherein the clipping frame has a panel receptacle disposed a side of the clipping frame and the side of the clipping frame is away from the rear bezel, the display panel is disposed in the panel receptacle and the clipping frame and the rear bezel fix each other.

10. The liquid crystal display of claim 1, wherein the display panel has a liquid crystal display panel and a controlling circuit board, the liquid crystal display panel is clipped between the front frame and the clipping frame and the controlling circuit board is bent to a side of the rear bezel from an edge of the liquid crystal display panel and the side of the rear bezel is away from the liquid crystal display panel.

11. The liquid crystal display of claim 1, wherein the light source module comprises at least a light emitting source and a plurality of optical film plates and the light emitting source is disposed at a side of each of the optical film plates.

12. A assembly method of a liquid crystal display, comprising:
providing a rear bezel having a main body, a receptacle and a plurality of carrying stages, wherein the carrying stages surround the receptacle, the receptacle protrudes from the main body along a direction, the carrying stages protrude from the main body and toward a reverse of the direction, and the main body, the receptacle and the carrying stages are formed in one piece;
fixing a signal controlling module in the receptacle;
disposing a light source module on the carrying stages;
clipping the light source module between the rear bezel and the clipping frame;
installing a display panel on the clipping frame; and
clipping the display panel by the front frame so that the display panel is located between the clipping frame and the front frame.

13. The assembly method of claim 12, wherein the display panel has a liquid crystal display panel and a controlling circuit board, and the step of installing the display panel comprises clipping the liquid crystal display panel between the front frame and the clipping frame and bending the controlling circuit board to a side of the rear bezel from an edge of the liquid crystal display panel and the side of the rear bezel is away from the liquid crystal display panel.

14. The assembly method of claim 12, wherein the front frame is further fixed on the rear bezel so that the display panel and the light source module are fixed between the front frame and the rear bezel.

15. The assembly method of claim 12, wherein the clipping frame is further fixed on the rear bezel so that the light source module is fixed between the clipping frame and the rear bezel.

16. A liquid crystal display, comprising:
a rear bezel having a receptacle;
a signal controlling module fixed in the receptacle of the rear bezel;
a display panel disposed on the signal controlling module, wherein the signal controlling module is located between the rear bezel and the display panel; and
a controlling circuit board electrically connected to the display panel, wherein the controlling circuit board is located at outside of the rear bezel so that the rear bezel is located between the controlling circuit board and the display panel.

17. The liquid crystal display of claim 16, wherein the rear bezel is formed in one piece.

18. The liquid crystal display of claim 16, wherein the rear bezel further has a plurality of fixing pillars located in the receptacle and the signal controlling module is fixed on the fixing pillars.

19. The liquid crystal display of claim 16 further comprising a flexible printed circuit board connected between the controlling circuit board and the display panel.

* * * * *